W. PURCELL.
TRANSMISSION CONTROL.
APPLICATION FILED JUNE 30, 1920.
1,413,133.
Patented Apr. 18, 1922.
4 SHEETS—SHEET 3.
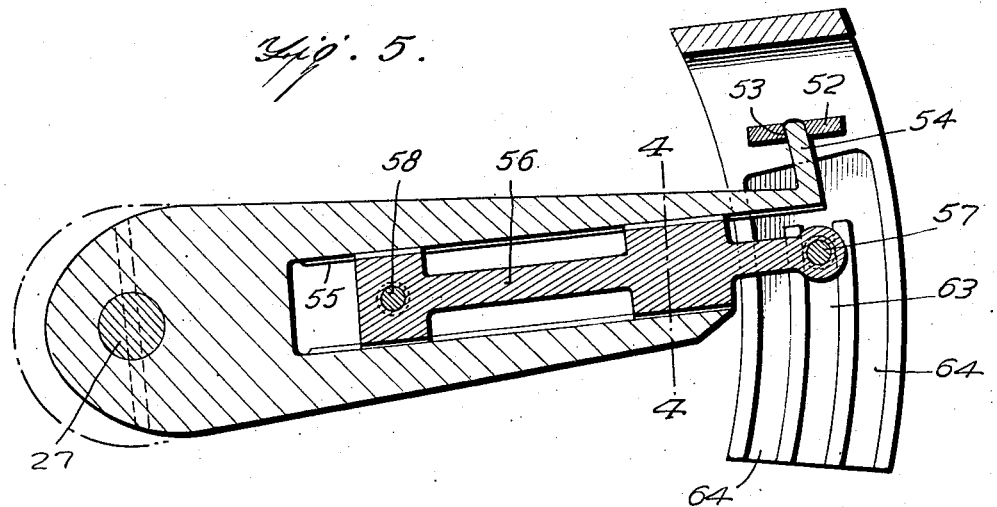
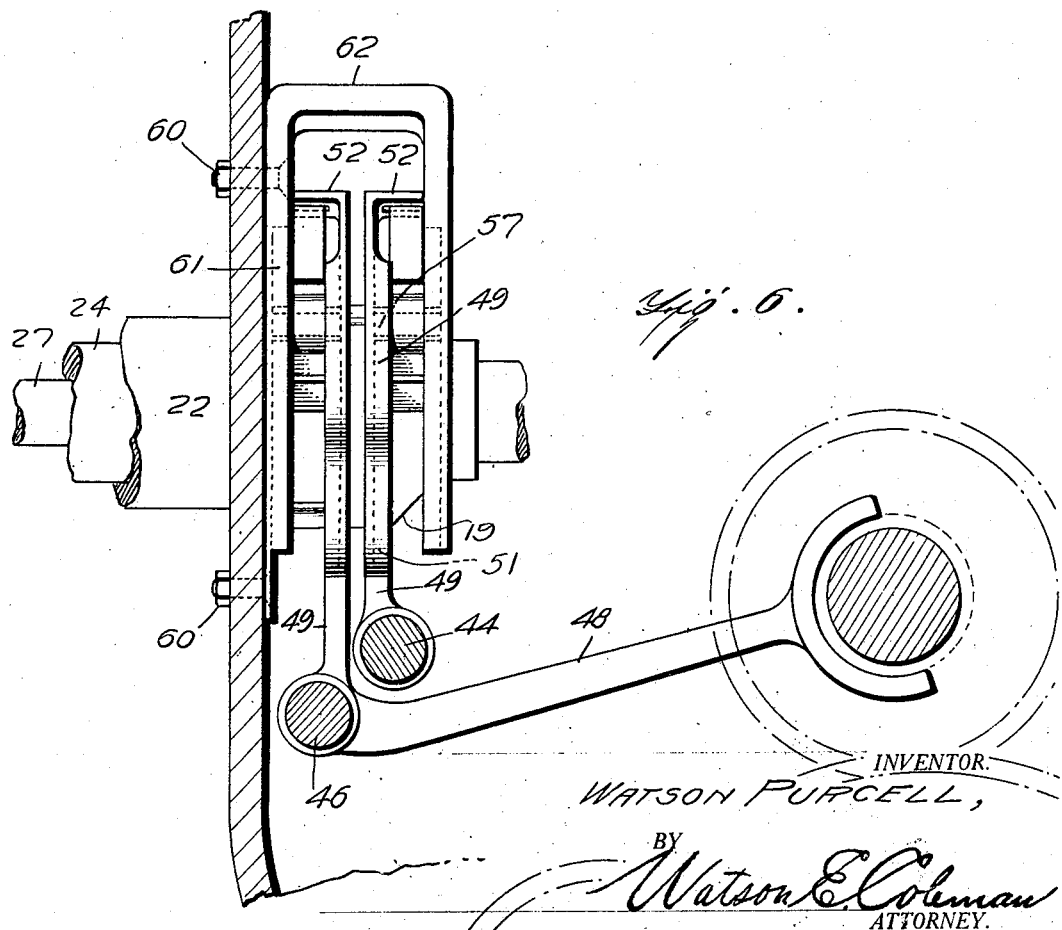
INVENTOR.
WATSON PURCELL,
BY
Watson E. Coleman
ATTORNEY.

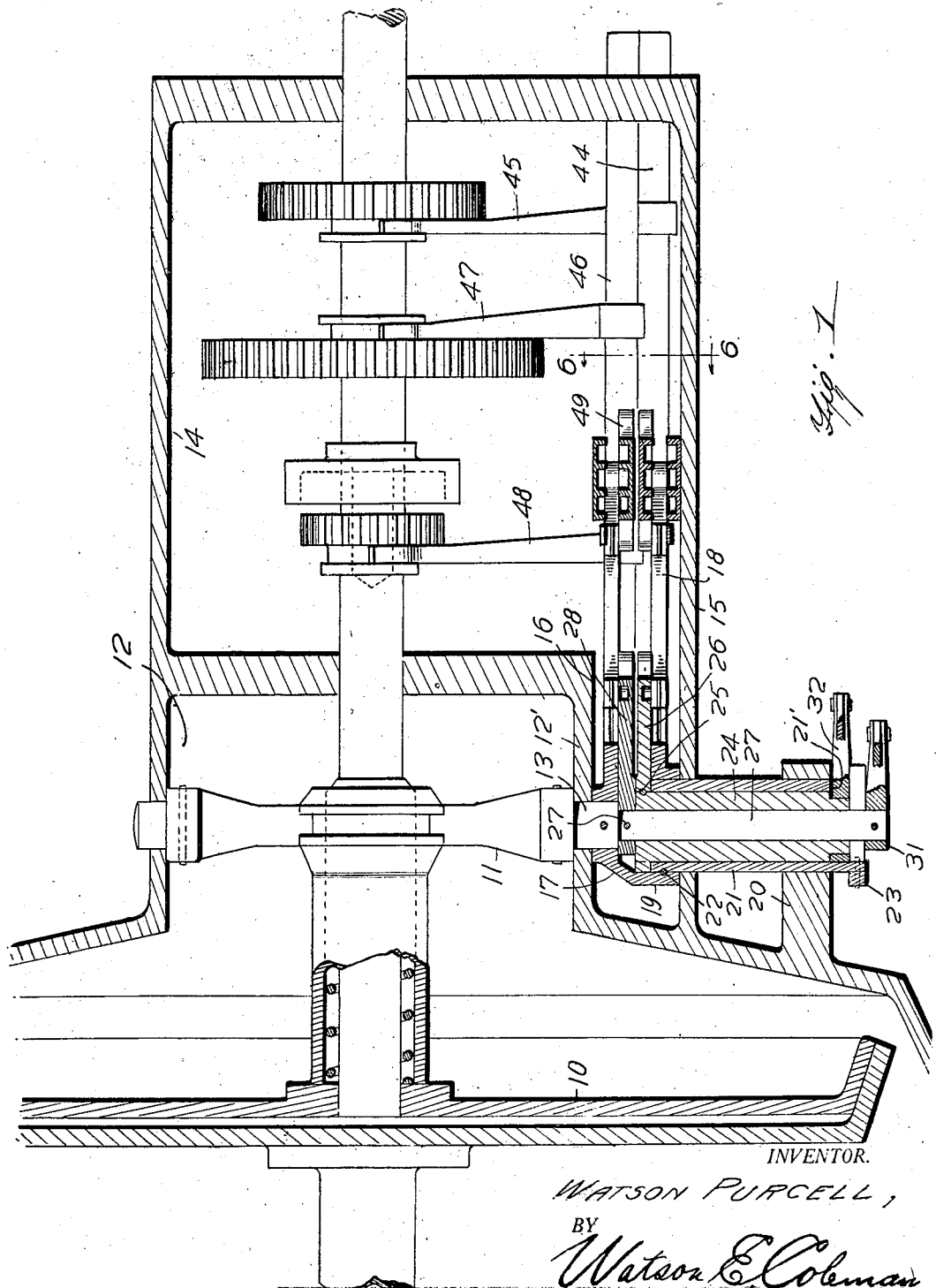

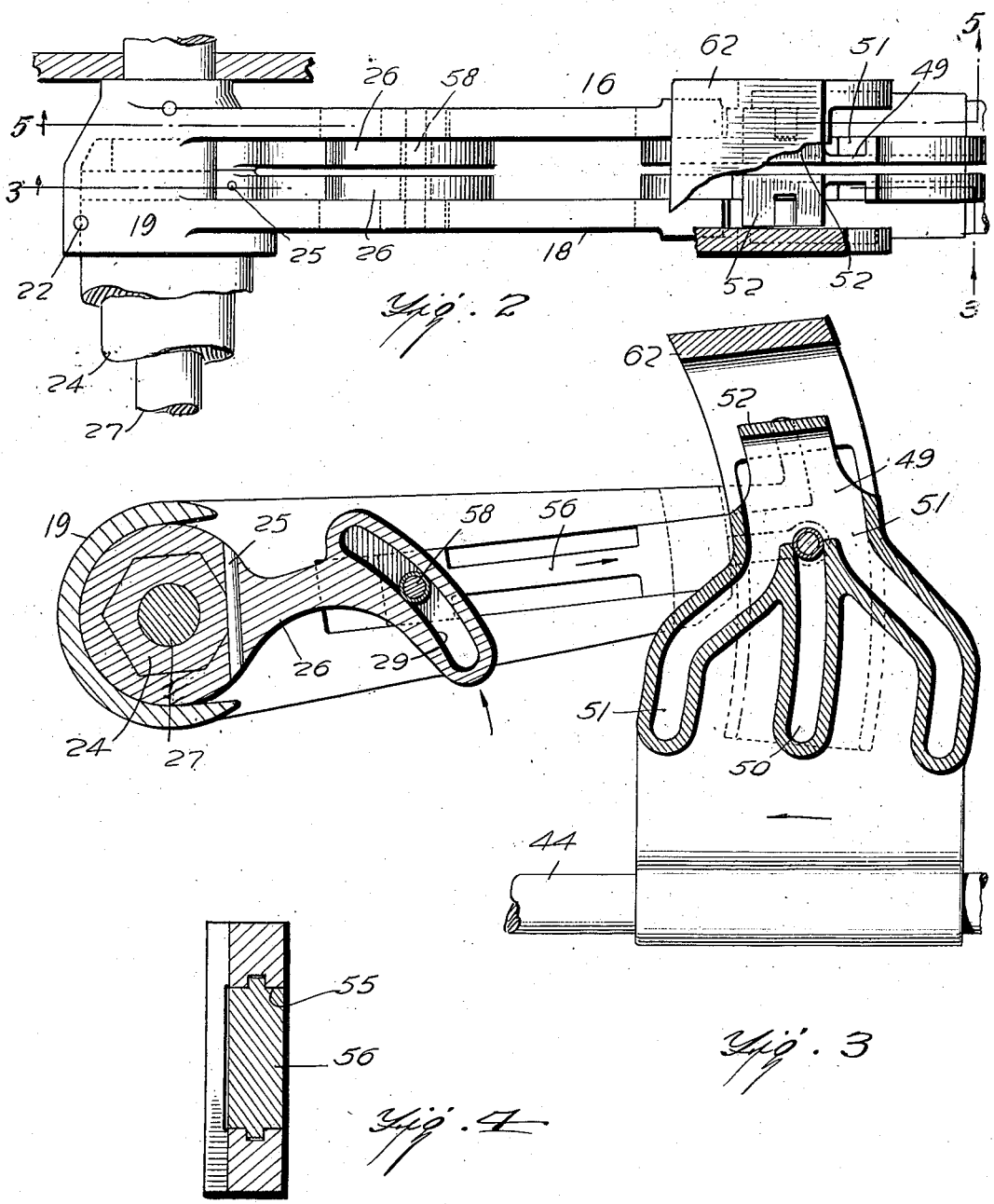

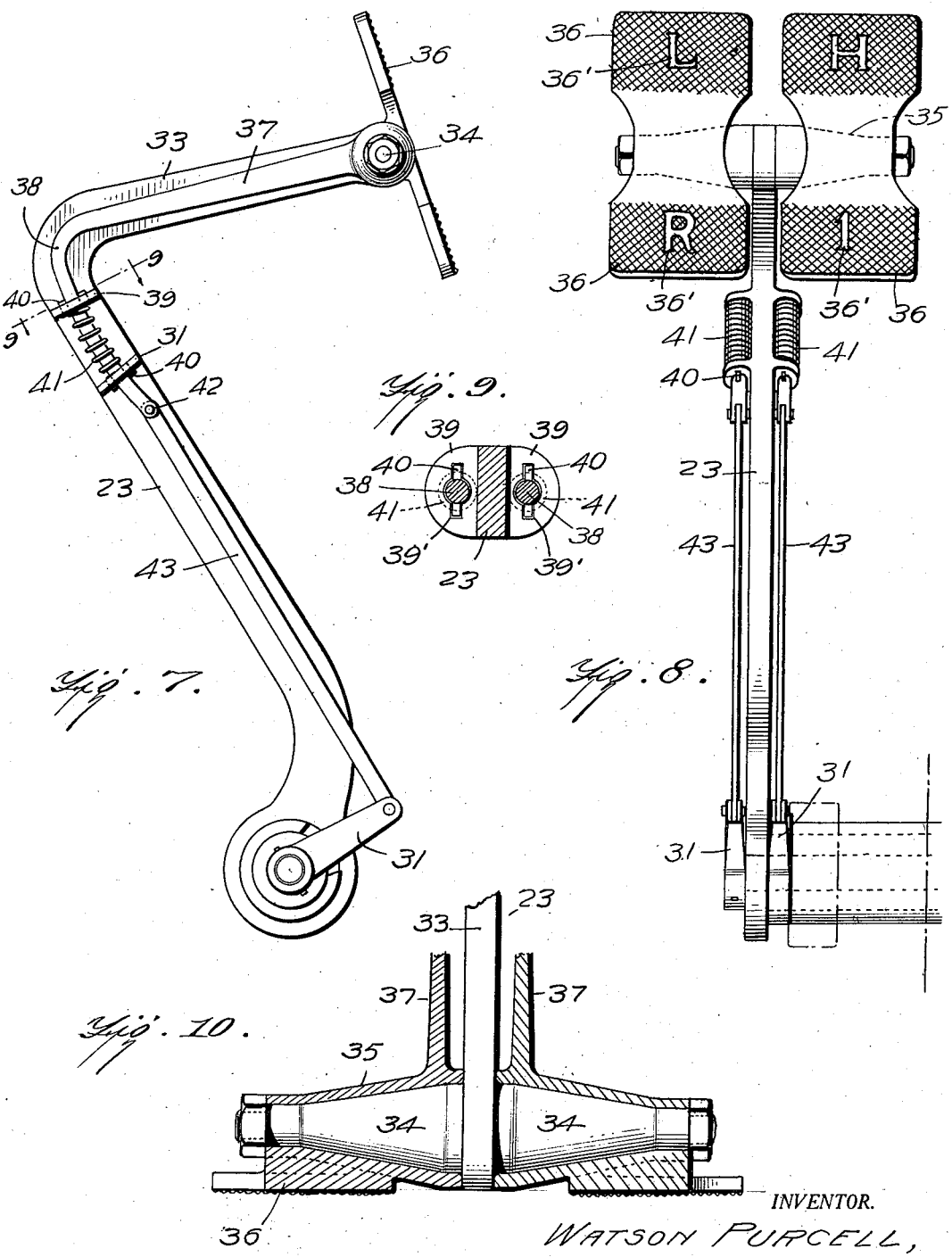

UNITED STATES PATENT OFFICE.

WATSON PURCELL, OF COLEMAN, TEXAS.

TRANSMISSION CONTROL.

1,413,133.   Specification of Letters Patent.   Patented Apr. 18, 1922.

Application filed June 30, 1920. Serial No. 393,125.

*To all whom it may concern:*

Be it known that I, WATSON PURCELL, a citizen of the United States, residing at Coleman, in the county of Coleman and State of Texas, have invented certain new and useful Improvements in Transmission Controls, of which the following is a specification, reference being had to the accompanying drawings.

This invention relates to transmission controls and more particularly to transmission controls particularly adapted for use on self propelled vehicles.

An important object of the invention is to provide means whereby the usual clutch control and gear control in multiple speed transmissions is combined and operated by means of a single pedal.

A further object of the invention is to provide a novel construction of transmission control which is compact and requires a minimum space and which is highly efficient in operation.

A still further object of the invention is to provide means whereby the driver of a self propelled vehicle is prevented from bringing the clutch thereof into engagement before completing the shifting of the gears whereby the speed of the vehicle is governed, and conversely to prevent shifting of the gears before the clutch is disengaged. It is well recognized that these two mistakes, are the ones which are most frequently made in gear shifting in self propelled vehicles, and are the mistakes which cause stripping of the gears and undue wear upon the clutch.

A further object of the invention is to provide a clutch pedal lever having oscillatory foot pedals which control the movement of the change speed gears of the transmission.

Other objects and advantages will become apparent throughout the course of the following description.

In the accompanying drawings, wherein for the purpose of illustration is shown a preferred embodiment of my invention and wherein like reference characters designate like parts throughout:

Figure 1 is a longitudinal sectional plan of my transmission control.

Figure 2 is an enlarged detail view showing the operating arms shifted with the clutch pedal.

Figure 3 is a section taken on the line 3—3 of Figure 2.

Figure 4 is a section taken through one of the operating arms.

Figure 5 is a section taken on the line 5—5 of Figure 2.

Figure 6 is a section taken on the line 6—6 of Figure 1.

Figure 7 is a side elevation of the clutch pedal employed in my invention.

Figure 8 is a rear elevation thereof.

Figure 9 is a section taken on the line 9—9 of Figure 7.

Figure 10 is an enlarged detail sectional view, parts being shown in elevation, illustrating the mounting of the operating mechanism for the gears of the change speed gearing upon the clutch pedal.

In the employment of my invention, the clutch 10 is provided which has portions connected to the driving shaft and portions connected to the driven shaft, these portions being adapted to be brought into engagement upon rotation of a member 11. The construction of the clutch member may be as desired either of the friction disc type or of the cone or direct connection system.

The clutch together with the member 11 are mounted in a suitable casing or housing 12, the member 11 being secured to an operating shaft 13 which is rotatably mounted in the side walls of this housing. A change speed gear casing 14 is provided arranged adjacent the clutch housing 12 and preferably having one end coincident with and forming one end of the clutch housing. The gear casing 14 is positioned slightly eccentrically with relation to the clutch housing 12 in order that one side of the gear casing may coincide with one side of the clutch housing whereas the other side 15 of the gear casing will be spaced from the corresponding side wall 12' of the clutch housing forming a space 16.

One end of the shaft 13 projects into the space 16 and has secured thereto a member 17 embodying a pair of arms 18 extending from one side thereof, and a sleeve like portion 19. Rotatably mounted in the side wall 15 of the gear casing 14 and in a lug 20 extending rearwardly from the clutch housing, is a sleeve 21 which is secured as at 22 to the sleeve like portion 19 of the member 17, the inner end of the sleeve 21 extending into the portion 19. The outer end of the sleeve 21 has secured thereto a clutch pedal arm 23 by means of which the sleeve 21, member 17, shaft 13 and member 11 may be simultaneously oscillated.

Rotatably mounted within the sleeve 21 is a second sleeve 24, having secured to its inner end, as at 25, a cam member 26. Rotatably mounted within the sleeve 24 is a stub shaft 27, having secured thereto, at the inner end thereof as at 27', a cam member 28. These cam members 26 and 28 extend intermediate the arms 18 of the member 17, one of the members 26 or 28 lying next adjacent each of the arms. Each cam member is provided at its outer or free end with an angularly disposed arcuate groove 29 for a purpose hereinafter to appear.

The outer end 30 of the stub shaft 27 has secured thereto an operating arm 31 and the sleeve 24 has secured thereto an operating arm 32, the operating arm 32 of the sleeve 24 extending through a slot 21' formed in the sleeve 21. By inspection of the drawings it will be seen that the operating arms 31 and 32 extend upon opposite sides of the pedal lever 23.

The upper end of the clutch pedal lever 23 is provided with an angular extension 33 terminating in oppositely extending trunnions 34 arranged at right angles to the extension 33 and disposed in a horizontal plane. These trunnions 34 have rotatably mounted thereon sleeves 35 provided upon their rear faces with pedals 36 by means of which the sleeves 35 may be rotated. These pedals as will hereinafter appear have portions corresponding to corresponding stop changes in the transmission and are lettered accordingly as indicated at 36'.

Each sleeve 35 has secured thereto an arm 37 extending adjacent the angular extension 33 of the clutch pedal lever and each of these arms is provided with a downwardly extending portion 38 curved upon an arc having as its center the center of the trunnions 34. Secured to the opposite sides of the clutch pedal lever 23 are fixed pairs of guides 39 having apertures through which the arcuate extensions 38 pass. Extending through the extensions 38 are transverse pins 40 which are spaced apart a distance equal to the distance between the guides 39 and normally positioned in alinement therewith. Set springs 41 extend intermediate the guides 39 and pins 40 and are coiled about the extensions 38. The pins 40 are of sufficient length to prevent passage of the spring 41 and the guides 39 are provided with recesses 39' alined with the pins and permitting passage thereof through the guides. The lower ends of the extensions 38 are pivotally connected as at 42 to links 43 which are in turn pivotally connected to the operating arms 31 and 32 of the stub shaft 27 and sleeve 24 respectively.

It will be seen that if pressure is placed upon the upper end of either of the pedals 36 the corresponding arm thereto will be forced downwardly placing the spring 41 under compression between the uppermost transverse pin 40 and the lowermost guide 39 and depressing the operating arm 31 or 32, as the case may be, to which it is attached. When the pedal is released the spring 41 will return this arm to normal position. If the pedal 36 has the pressure applied thereto applied to the lower portion thereof, the spring 41 is compressed between the lowermost pin 40 and the uppermost guide 39 and the operating arm corresponding thereto is elevated. When the pressure is released the spring 41 again places the pedal in normal position.

Slidably mounted in the gear casing 14, longitudinally thereof is a shifting shaft 44 provided with a shifting fork 45 which governs the shifting of the gear controlling the low and reverse transmission gearing. A second longitudinal shiftable shaft 46 is mounted longitudinally in the casing 14 and is provided with shifting forks 47 and 48 governing the shifting of the intermediate and high speed gears respectively.

Secured to each of the shafts 44 and 46 are selector plates 49 each provided with a central groove 50 hereinafter referred to as a neutral groove, and grooves 51 arranged to each side of the neutral groove which control the shifting of the shaft, this groove being appropriately curved in order to cause the shaft to shift the desired distance to bring the gear selected into engagement with drive the driven shaft. Each of these plates is likewise provided with an overhanging shoulder 52 which overlays the upper ends of the grooves or slots 50 and 51.

Each of the arms 18 of the member 17 is provided upon its rear end with an arcuate latching foot 54 which will when properly alined with the aperture 53 of the overhanging portion 52 pass therethrough. Each of the arms is likewise provided with a longitudinally extending groove or slot 55 in which is slidably mounted a member 56 provided upon its rear end with an angular portion or selector finger 57 adapted to engage in the grooves or slots 50 and 51 and upon its forward end with an angular extension 58 engaging in the angular arcuate slot 29 of the cam member 28, the arrangement of the arms 28 and 26 with respect to their respective arms 18 being exactly similar. The angular portions 57 and 58 of the longitudinal shiftable member 56 may be, if so desired, provided with rollers to eliminate excessive friction.

Secured to the wall 15 of the casing by means of bolts 60 or the like is one arm 61 of an inverted U shaped plate 62 which is so positioned as to be alined with the selector plates 49 when they are in neutral position. The interior of the arms which are spaced upon opposite sides of the arms 18 of the members 17 from the selector plates 49 are provided with a neutral groove 63 and other grooves 64 arranged upon opposite sides of the neutral groove. These grooves are arcuately curved with the pivot point of the arms 18 as a center and the grooves are spaced apart a distance equal to the spacing of the upper ends of the grooves 50 and 51 of the selector plates 49. The selector fingers 57 of the longitudinally shiftable members 56 extend entirely therethrough and have their ends engaging the arms 61 of the plates 62 for selective engagement in the grooves 63—64 thereof. The extension of the pins 57 enters the corresponding grooves upon the arms 61 at the same time as it enters the grooves 50 and 51 of the plate 49. As this plate is fixed it will be seen that when the longitudinally shiftable member is shifted and the extension 19 engaged in one of the slots thereof, shifting of the arm 18 will not cause any change in the relative position of the selector finger 57, thereby assuring that the selector plates 49 shift longitudinally when either of the grooves 51 thereof is engaged.

The operation of my device is as follows: Assuming all of the gears to be disengaged and the clutch to be likewise disengaged, the arcuate extension 54 of the arms 18 will be alined with the aperture 53 of the overhanging portions 52 of the plates 49 and the arm 18 will have been rotated and the angular extension extending through the aperture freeing the angular extension or selector finger 57 of the longitudinal shiftable member 56 from the grooves. By oscillation of the desired pedal the corresponding cam member 28 may now be oscillated. Assuming oscillation to be in the direction indicated by the arrow in Figure 3, the longitudinal shiftable member 56 moves rearwardly in the direction of the arrow and alines with the slots 51 and 64 furthermost to the rear of the plates 49 and 62 respectively. If the clutch is now released to move in the direction of the arrow on Figure 7, the angular extension 54 of the members 18 is withdrawn from the aperture 53 and the angular extension 57 of the longitudinal shiftable member 56 may enter the groove with which it is alined causing the shaft attached thereto to shift in the direction of the arrow on Figure 3. It will be obvious that an attempt to bring the clutch into engagement, when the longitudinal shiftable member 56 has not been moved sufficiently to properly aline the extension 57 with the slot which it is desired that it shall enter, will be frustrated by the contact of the member 57 with the walls intermediate the slot faces preventing the withdrawal of the arcuate extension 54 of the arms 18 from the slots 53 of the overhang. It will likewise be realized that as the extension 57 is not clear of the slots 50 and 51 of the plates 49 and 63 and 64 of the plate 62 until the arcuate extension is fully engaged in the slot 53 it will be impossible to change the gears without first releasing the clutch.

It will be understood that I do not limit myself to a four-speed transmission construction nor to the particular arrangement of the parts hereinbefore described. As many changes are obviously possible I do not limit myself to the specific structure hereinbefore set forth, but may make any such changes, without departing from the spirit of the invention or the scope of the subjoined claims.

Having now described my invention, what I claim is:

1. In a control of the type described, a clutch, change speed gearing, an operating mechanism for the clutch including a shaft, a pair of arms carried by said shaft one of which forms a clutch shaft operating lever, selector mechanism for said change speed gearing including a selector finger shiftable upon the other of said arms, and means mounted upon the first named arm and operatively connected with said finger to shift the same.

2. In a control of the type described, a clutch, embodying sections shiftable to engaged and disengaged positions, a shiftable pedal lever control therefor mounted for oscillation, change speed gearing, selector mechanism for said gearing and operating means for said change speed gearing both carried by said pedal lever control, said operating means being operable when said clutch sections are disengaged and inoperable when said clutch sections are engaged.

3. In a control of the type described, a clutch embodying sections shiftable to engaged and disengaged positions, a shiftable pedal lever control therefor, change speed gearing and means carried by said pedal lever control for shifting the gears of said change speed gearing, embodying, pedals pivotally connected with said pedal lever control, selector mechanism associated with said change speed gearing actuated by said pedals and means connected with said pedal lever control for preventing the actuation of said selector mechanism when the sections of said clutch are in engaged position.

4. In a control of the type described, a clutch, embodying sections shiftable to engaged and disengaged positions, a shiftable pedal lever control therefor, change speed gearing and means carried by said pedal lever control for shifting the gears of said change speed gearing, embodying, pedals pivotally connected with said pedal lever control, selector mechanism associated with said change speed gearing actuated by said pedals and means connected with said pedal lever control for preventing the actuation of said selector mechanism when the sections of said clutch are in engaged position, said last named means being inoperable when the clutch sections are disengaged.

5. In a control of the type described, a clutch, a lever control therefor, change speed gearing, selector mechanism for said change speed gearing and means mounted on said lever for operating said selector mechanism, said means being inoperative when the sections of such clutch are engaged.

6. In a control of the type described, a clutch embodying a section shiftable to engaged and disengaged positions, a shiftable pedal lever control therefor, change speed gearing and means carried by said pedal lever control for shifting said gears when said clutch is in disengaged position and preventing the shifting of the gears of said change speed gearing when the clutch sections are in engaged position embodying selector plates, arms connected with said pedal lever control to be oscillated thereby, portions carried by said arms adapted to engage portions of said selector plates when the lever is in the position in which the section of said clutch is in disengaged position and a selector finger carried by said arm and shiftable thereon when the portions of said arm are in engagement with the portions of said selector plates and held against shifting when the portions of said arm are out of engagement with the portions of said selector plates and the section of said clutch in engaged position and while the section thereof is moving from engaged into disengaged positions.

7. In a control of the type described, a clutch embodying a section shiftable to engaged and disengaged positions, a shiftable pedal lever control therefor, change speed gearing and means carried by said pedal lever control for shifting said gears when said clutch is in disengaged position and preventing the shifting of the gears of said change speed gearing when the clutch sections are in engaged position embodying shiftable pedals mounted on said pedal lever control, selector plates connected with the shiftable gears of said change speed gearing, arms connected with said pedal lever control to be oscillated thereby, portions carried by said arms adapted to engage portions of said selector plates when the lever is in the position in which the section of said clutch is in disengaged position, a selector finger carried by said arm and shiftable thereon when the portions of said arm are in engagement with the portions of said selector plates and held against shifting when the portions of said arm are out of engagement with the portions of said selector plates and the section of said clutch is in engaged position and means connecting said pedals and said finger for shifting said finger.

8. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals pivotally mounted upon said lever for oscillation with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, means connecting said pedals and said selector fingers whereby said selector fingers are shifted when the pedals are oscillated and means holding the said selector finger against shifting when engaged with a groove of said selector plate.

9. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals mounted upon said lever and shiftable with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, and means connecting said pedals and said selector fingers whereby said selector fingers are shifted when the pedals are oscillated, embodying an arm connected to each of said pedals to be oscillated thereby when the pedals are shifted, means connecting said arms and said selector fingers whereby said fingers are shifted when the arms are oscillated and means engaging said selector fingers and preventing shifting thereof by said arms when said selector fingers are engaged in a groove of said selector plate.

10. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals pivotally mounted upon said lever for oscillation with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, means connecting said pedals and said selector fingers whereby said selector fingers are shifted when the pedals are oscillated and mean preventing the shifting of said selector finger when the clutch sections are engaged.

11. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals pivotally mounted upon said lever for oscillation with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, means connecting said pedals and said selector fingers whereby said selector fingers are shifted when the pedals are oscillated, means preventing the engagement of said clutch sections when the selector finger is not properly alined with the selected groove and means preventing shifting of the selector finger when engaged with a groove of said selector plate.

12. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals pivotally mounted upon said lever for oscillation with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, means connecting said pedals and said selector fingers whereby said selector fingers are shifted when the pedals are oscillated, means preventing the shifting of said selector finger when the clutch sections are engaged and means preventing the engagement of said clutch sections when the selector finger is not properly alined with the selected groove.

13. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals mounted upon said lever and shiftable with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, means connecting said pedals and said selector fingers whereby said selector fingers are shifted when the pedals are oscillated, embodying an arm connected to each of said pedals to be oscillated thereby when the pedals are shifted and means connecting said arms and said selector fingers whereby said fingers are shifted when the arms are oscillated, and means preventing the shifting of said selector finger when the clutch sections are engaged.

14. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals mounted upon said lever and shiftable with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, means connecting said pedals and said selector fingers whereby said selector fingers are shifted when the pedals are oscillated, embodying an arm connected to each of said pedals to be oscillated thereby when the pedals are shifted, means connecting said arms and said selector fingers whereby said fingers are shifted when the arms are oscillated, and means preventing the engagement of said clutch sections when the selector finger is not properly alined with the selected groove and means preventing shifting of said selector finger when engaged with a groove of said selector plate.

15. In a control of the type described, a clutch embodying sections shiftable to engaged and disengaged positions, a shiftable pedal lever control therefor, change speed gearing and means carried by said pedal lever control for shifting the gears of said change speed gearing embodying a pair of pedals mounted upon said lever and shiftable with relation thereto, a pair of shafts connected with the shiftable gears of said change speed gearing to shift the same, a grooved selector plate secured to each of said shafts, a shiftable selector finger engaging each of said selector plates and adapted to be shifted to selectively engage the grooves thereof, means connecting said pedals and said selector fingers whereby said selector fingers are shifted when the pedals are oscillated, embodying an arm connected to each of said pedals to be oscillated thereby when the pedals are shifted and means connecting said arms and said selector fingers whereby said fingers are shifted when the arms are oscillated, means preventing the shifting of said selector finger when the clutch sections are engaged and means preventing the engagement of said clutch sections when the selector finger is not properly alined with the selector groove.

16. In a device of the type described, a drive shaft, a driven shaft, a clutch embodying shiftable portions adapted to be brought into engagement to connect said shafts, a power transmission shaft, change speed gearing connecting the power transmission shaft and said driven shaft, an oscillatory control for bringing the shiftable sections of said clutch into engagement, means connected with said control for shifting the gears of said change speed gearing, and means for preventing engagement of the sections of said clutch when said gear shifting means is not properly alined to shift said gears.

17. In a device of the type described, a drive shaft, a driven shaft, a clutch embodying shiftable portions adapted to be brought into engagement to connect said shafts, a power transmission shaft, change speed gearing connecting the power transmission shaft and said driven shaft, an oscillatory control for bringing the shiftable sections of said clutch into engagement, gear selecting mechanism, means connected with said control for operating the gear-shifting mechanism, means preventing shifting of the gears of said change speed gearing when said clutch sections are brought into engagement by said clutch control and means preventing shifting of said gears while the clutch sections are disengaged but permitting of a selection of gears to be shifted, the shifting of said control during the return of the clutch sections to engaged position shifting the gears selected to engaged position.

18. In a device of the type described, a drive shaft, a driven shaft, a clutch embodying shiftable portions adapted to be brought into engagement to connect said shafts, a power transmission shaft, change speed gearing connecting the power transmission shaft and said driven shaft, an oscillatory control for bringing the shiftable sections of said clutch into engagement, means connected with said control for shifting the gears of said change speed gearing, means preventing shifting of the gears of said change speed gearing when said clutch sections are brought into engagement by said clutch control and means preventing the engagement of said clutch when said gear shifting means is not properly alined to shift said gears.

19. In selector mechanism for change speed gearing embodying shiftable gears, a shaft, means connecting said shaft and the shiftable gears of said gearing whereby the gears may be shifted, a plate secured to said shaft and embodying spaced grooves, said plate being provided with an overhanging portion, an arm mounted for oscillation, a member slidably mounted in said arm and provided with a portion adapted to interchangeably engage in the grooves of said plate, a latching foot carried by said arm and adapted to engage in said plate, the groove engaging portion of said slidable member being held against disengagement from said grooves when said latching foot is in disengaged position, means for shifting said slidably mounted member and means holding said member against movement with relation to said arm when the selector finger thereof is in engagement with any of said grooves.

20. In selector mechanism for change speed gearing embodying shiftable gears, a selector plate provided with grooves, an arm mounted for oscillation, a member slidably mounted therein and provided with a selector finger adapted to selectively engage said grooves, a shiftable cam, means connecting said member and said cam whereby said member is shifted by said cam and means preventing shifting of said member with relation to said arm when the selector finger of said member is entered in one of said grooves.

21. In selector mechanism for change speed gearing embodying shiftable gears, a selector plate provided with neutral and control grooves, an arm mounted for oscillation, a member slidably mounted therein and provided with a selector finger adapted to selectively engage said grooves, a shiftable cam, means connecting said member and said cam whereby said member is shifted by said cam and means normally holding said cam in position to aline said selector finger with the neutral groove of said selector plate, means preventing shifting of said member with relation to said arm when the selector finger of said member is entered in one of said grooves.

22. In a control of the type described, a clutch embodying sections shiftable to engaged and disengaged positions, a lever control therefor, change speed gearing, selective mechanism for said change speed gearing embodying a grooved selector plate, a shiftable selector finger, means carried by said lever control for shifting said selector finger to aline the same with the grooves of said selector plate and means preventing movement of the selector finger by said control carried means when said finger is engaged in a groove of the selector plate.

23. In a control of the type described, a clutch embodying sections shiftable to engaged and disengaged positions, a lever control therefor, change speed gearing, selective mechanism for said change speed gearing embodying a grooved selector plate, a shiftable selector finger, means carried by said lever control for shifting said selector finger to aline the same with the grooves of said selector plate, said last named means being operable when the clutch sections are disengaged and inoperable when the clutch sections are engaged and means preventing movement of the selector finger by said control carried means when said finger is engaged in a groove of the selector plate.

24. In a control of the type described, a clutch embodying sections shiftable to engaged and disengaged positions, a lever control therefor, change speed gearing selective mechanism for said change speed gearing embodying a grooved selector plate, a shiftable selector finger, means carried by said lever control for shifting said selector finger to aline the same with the grooves of said selector plate, said last named means being operable when the clutch sections are disengaged and inoperable when the clutch sections are engaged, means preventing movement of the selector finger by said control carried means when said finger is engaged in a groove of the selector plate, and means preventing the engagement of said clutch sections by said lever control when said selector finger is not properly alined with one of the grooves of said selector plate.

25. In a control of the type described, a clutch, a shiftable pedal lever control therefor, change speed gearing embodying shiftable gears, pedals pivotally mounted on said control lever, and means connecting said pivotal pedals and said shiftable gears for shifting said gears and means preventing shifting of said pivotal pedals when the clutch sections are engaged.

26. In a control of the type described, a clutch, a bodily shiftable operating member therefor, change speed gearing, selector mechanism for said change speed gearing, and shiftable means carried by said operating member for operating said selector mechanism when said operating means is shifted, said means being shiftable when the clutch sections are disengaged and inoperable when the clutch sections are engaged.

27. In a control of the type described, a clutch, change speed gearing, selector mechanism for said change speed gearing, a plurality of rotatably mounted concentric members one of which forms an operating member for said clutch, means connecting the remaining members and said selector mechanism whereby said selector mechanism is operated when the members are rotated, and common means for independently rotating said members.

28. In a control of the type described, a clutch, change speed gearing, selector mechanism for said change speed gearing, a plurality of rotatably mounted concentric members one of which forms an operating member for said clutch, means connecting the remaining members and said selector mechanism whereby said selector mechanism is operated when the members are rotated, a lever secured to the clutch operating member for rotating the same and means mounted upon said lever for rotating the remaining concentric members.

29. In a control of the type described, as a subcombination, a shiftable shaft, a grooved selector plate secured to said shaft, a member mounted for oscillation, a stationary grooved plate, a selector finger carried by said member and adapted to simultaneously engage grooves in each of said plates and means for shifting said selector finger longitudinally of said oscillatory member.

30. In a control of the type described, as a subcombination, a shiftable shaft, a grooved selector plate secured to said shaft, a member mounted for oscillation, a stationary grooved plate, the grooves of said stationary plate being arcuately curved with the center of oscillation of said member as a center, a selector finger carried by said member and adapted to simultaneously engage grooves in each of said plates and means for shifting said selector finger longitudinally of said oscillatory member.

31. In a control of the type described, as a subcombination, a shiftable selector plate having grooves formed therein, an arm mounted for oscillation, a selector finger carried by said arm and adapted to selectively engage the grooves of said plate, said selector finger being shiftable on said arm for alinement with said grooves, and means for holding the finger against shifting with relation to said arm when the finger is engaged in any of said grooves.

32. In a control of the type described, as a subcombination, a shiftable selector plate having grooves formed therein, an arm mounted for oscillation, a selector finger carried by said arm and adapted to selectively engage the grooves of said plate, said selector finger being shiftable on said arm for alinement with said grooves, and means for holding said plate against shifting when said selector finger is out of engagement with said grooves.

33. In a control of the type described, as a subcombination, a shiftable selector plate having grooves formed therein, an arm mounted for oscillation, a selector finger carried by said arm and adapted to selectively engage the grooves of said plate, said selector finger being shiftable on said arm for alinement with said grooves, means for holding said plate against shifting when said selector finger is out of engagement with said grooves, and means preventing oscillation of said arm when said finger is not properly alined with one of said grooves.

34. In a control of the type described, as a subcombination, a shiftable selector plate having grooves formed therein, an arm mounted for oscillation, a selector finger carried by said arm and adapted to selectively engage the grooves of said plate, said selector finger being shiftable on said arm for alinement with said grooves, and means for holding the finger against shifting with relation to said arm when the finger is engaged in any of said grooves, and portions formed on said arm and engaging with portions of said plate for holding said plate against shifting when said selector finger is out of engagement with said grooves.

35. In a control of the type described, a clutch, a variable speed transmission mechanism, a selector mechanism, operating mechanism therefor, means carrying the operating mechanism for said selector mechanism and disconnecting the clutch, while the change of speeds of the transmission is effected, said operating mechanism being inoperative to effect a selection when the clutch is connected.

In testimony whereof I hereunto affix my signature.

WATSON PURCELL.